Figure 1:
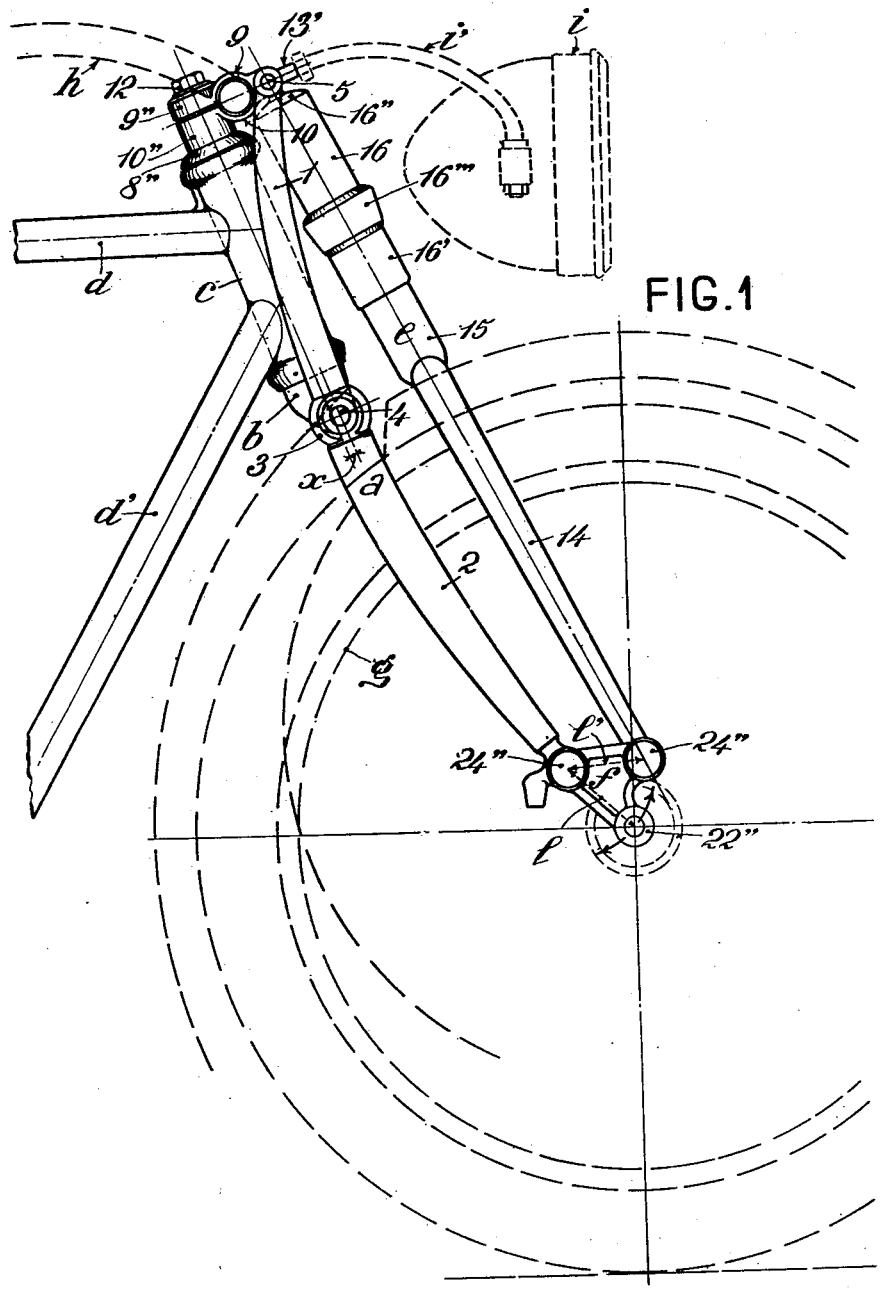

E. M. BORGO.
SPRING FORK FOR THE FRONT WHEELS OF MOTORCYCLES AND THE LIKE.
APPLICATION FILED FEB. 25, 1920.

1,370,404.

Patented Mar. 1, 1921.
4 SHEETS—SHEET 1.

E. M. BORGO.
SPRING FORK FOR THE FRONT WHEELS OF MOTORCYCLES AND THE LIKE.
APPLICATION FILED FEB. 25, 1920.
1,370,404.
Patented Mar. 1, 1921.
4 SHEETS—SHEET 2.
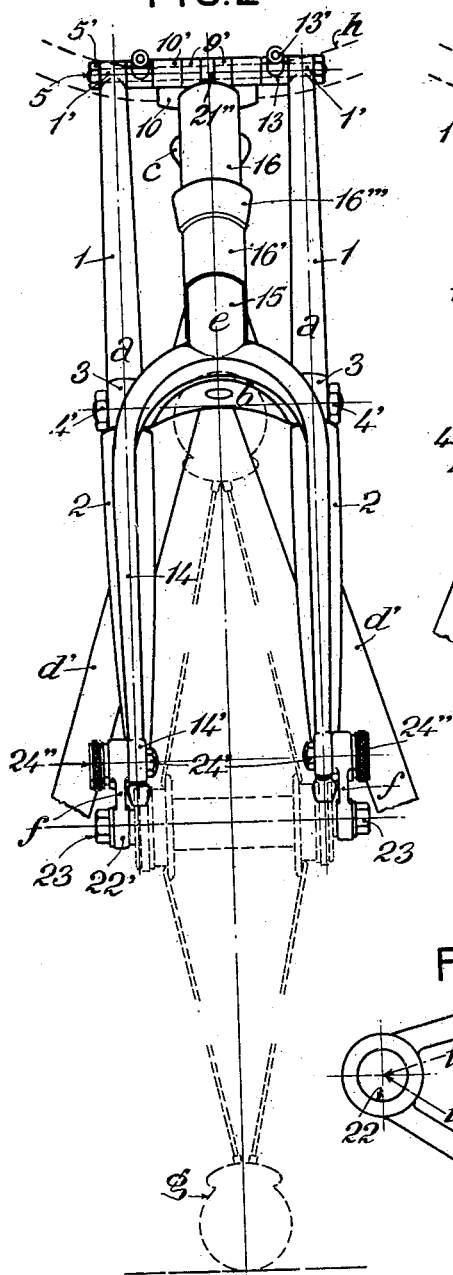
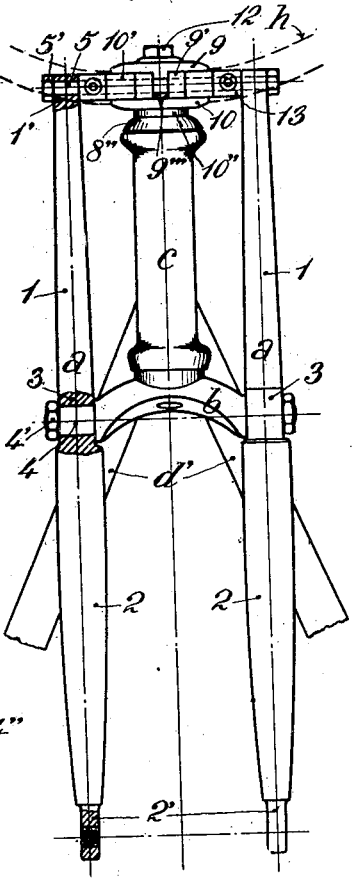
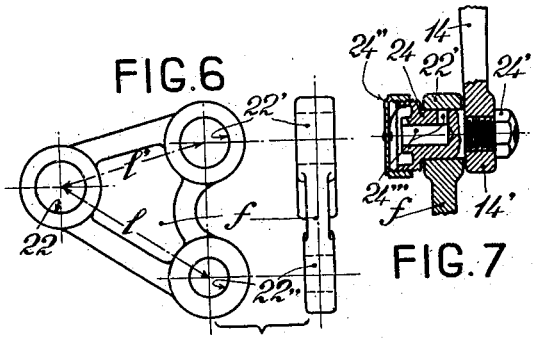
Inventor
Edmondo Michele Borgo
By [signature] atty.

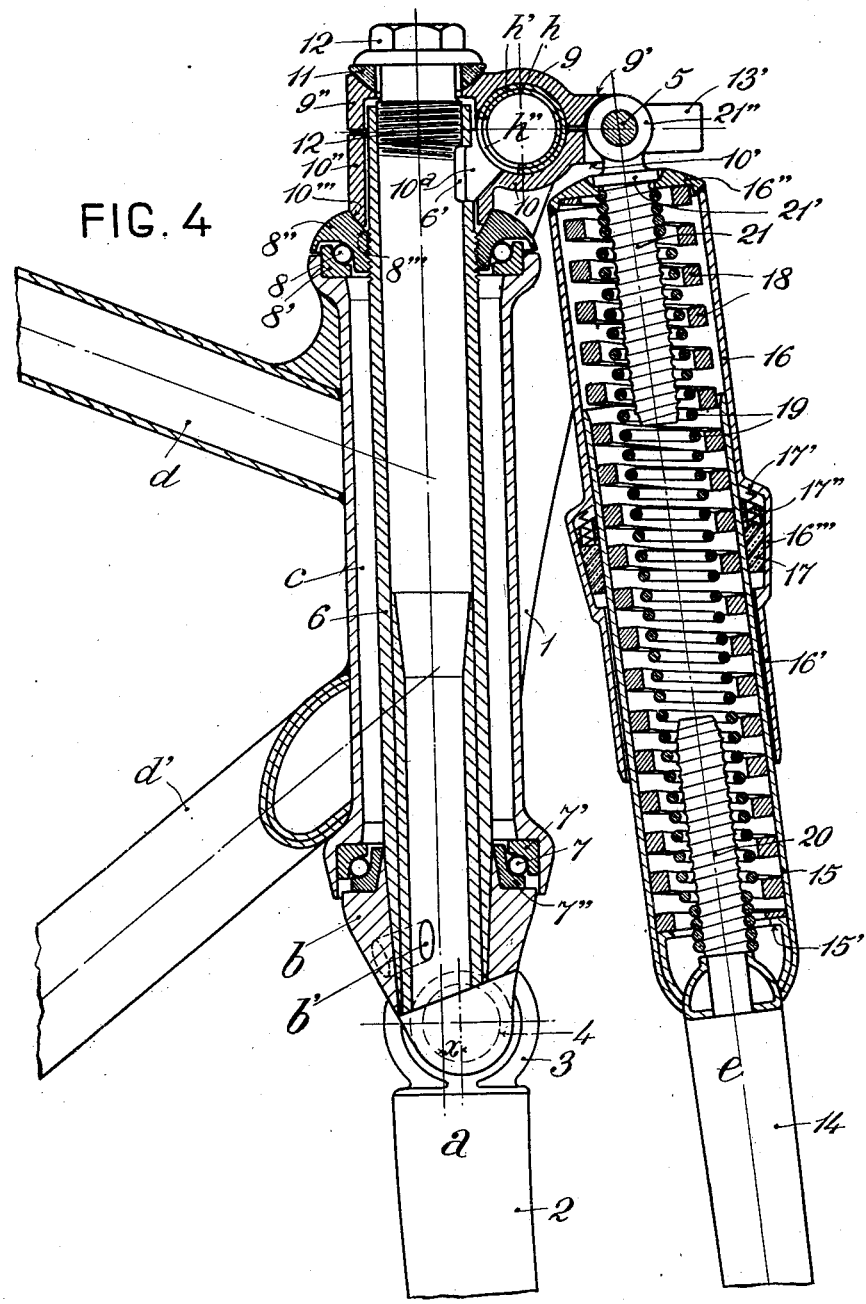

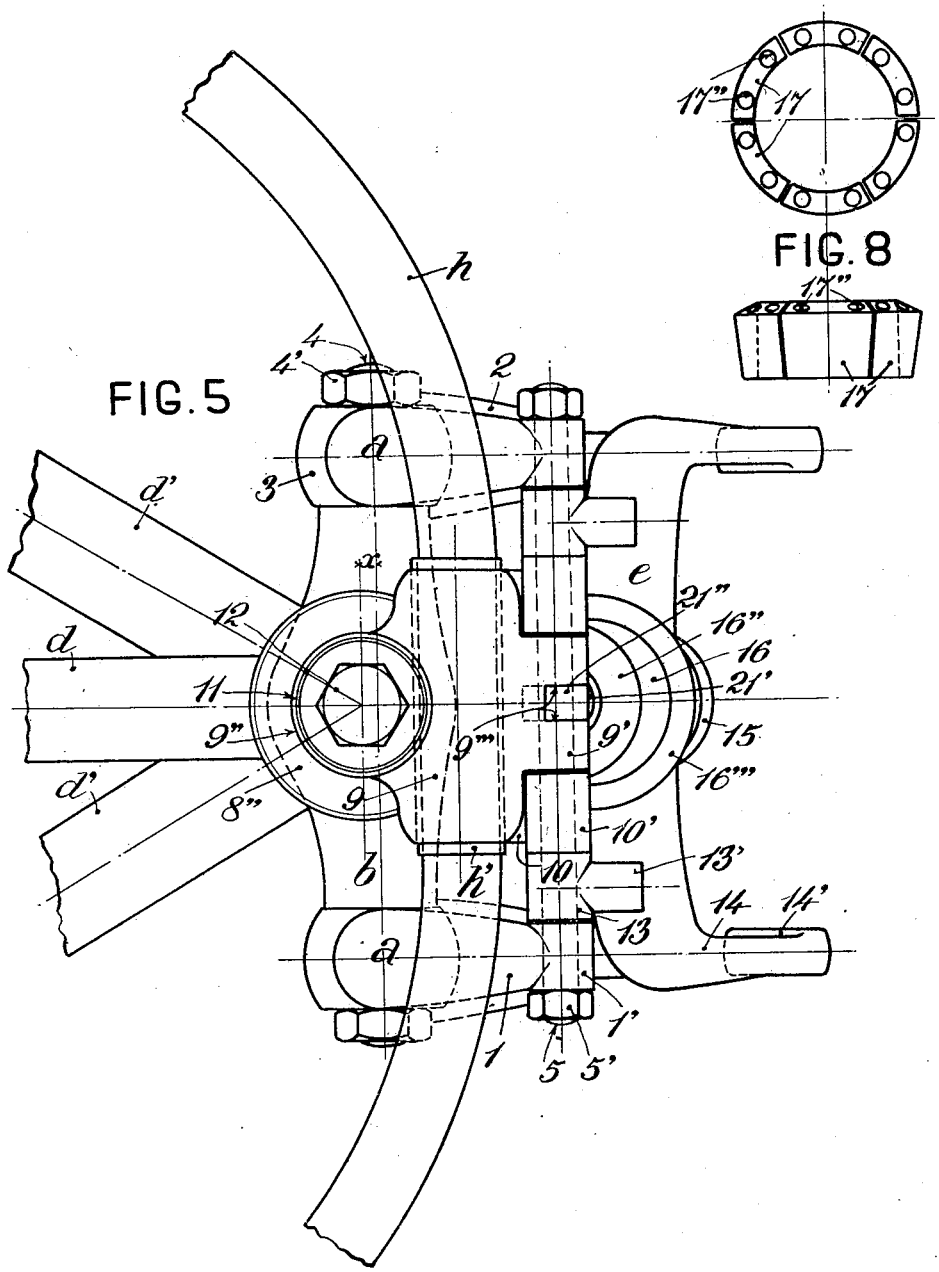

UNITED STATES PATENT OFFICE.

EDMONDO MICHELE BORGO, OF TURIN, ITALY.

SPRING-FORK FOR THE FRONT WHEELS OF MOTORCYCLES AND THE LIKE.

1,370,404.

Specification of Letters Patent.

Patented Mar. 1, 1921.

Application filed February 25, 1920. Serial No. 361,209.

*To all whom it may concern:*

Be it known that I, EDMONDO MICHELE BORGO, a subject of the King of Italy, residing at Turin, Italy, have invented certain new and useful Improvements in Spring-Forks for the Front Wheels of Motorcycles and the like; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

The present invention relates to a spring fork for the front wheel of motorcycles and the like.

This fork consists of a rigid rear fork fixed to the steering axle, and an elastic front counter-fork jointed to the former, directly at the top and indirectly at the lower end, by means of a pair of connecting links to which the axle of the wheel is fixed.

The principal features of the fork are substantially the following:

In the first place the rigid fork consists of two tubular members which are exactly alike and interchangeable, placed parallel to each other and slightly bent and spindle-shaped toward the ends. These members are coupled toward the middle, being mounted on lateral pins provided for this purpose in the bridge of the fork which is connected with the tubular steering axle, and at the top by means of a transverse stay-bolt on which are hinged two jaws which make it possible to adjust the handle-bar in any position. These jaws are provided behind with sleeves inserted upon the tubular steering axle and fastened together and against the adjusting cone of the steering head by means of a single bolt screwed inside the said steering axle.

Further, the spring counter-fork consists of two portions sliding one upon the other in opposition to the action of a compression spring and a rebound spring, the latter fixed at its ends to the two parts of the counter-fork by pins screwed into the end windings of the rebound spring. The counter-fork is provided with a brake, having a conical friction crown, intended to moderate the backward movement of the fork when it returns to its normal position of equilibrium after each deformation.

Again the counter-fork, jointed at the top to the transversal stay bolt coupling the two members of the rigid fork, is indirectly jointed at the bottom to the ends of the rigid fork by means of a pair of triangular links. These links are jointed by two of their ends, preferably by means of bolts with grease lubrication, to the lower eyes of the rigid fork and the elastic counter-fork—while near their third end they are fixed to the axle of the wheel.

Other details and constructional characteristics are set forth in the following description.

A practical construction of this elastic fork is shown, by way of example in the accompanying drawing, in which: Figures 1 and 2 show the elastic fork as a whole in side and front elevation;—Fig. 3 shows only the rigid rear fork connected with the tubular steering axle in vertical front elevation;—Fig. 4 shows the general arrangement of the steering head and the elastic system of the counter-fork in detail, in vertical longitudinal section;—Fig. 5 is a plan view of the elastic fork as a whole;—Figs. 6, 7, 8 are details.

The elastic fork consists of the rigid rear fork —*a.a.b*—, fixed to the central steering axle which can rotate inside the steering head tube —*c*— to which the tubes —*d.d'*— of the frame are attached, and of the elastic front counter-fork —*e*— which is jointed to the rigid fork directly above and indirectly below by a pair of connecting links —*f*— to which is attached the axle of the hub of the wheel —*g*—.

The rigid fork consists of two members —*a.a*— which are exactly alike and are placed parallel and symmetrically in respect to the vertical axis of the fork, and which are composed of the two prongs 1, 2, slightly spindle-shaped and bent, attached together by the middle piece 3, and ending in the upper eye 1' and the lower eye 2'. The two members —*a.a*— by means of a hole provided in each piece 3' are mounted on the end pins 4 of the bridge —*b*— of the fork, the said bridge being attached, as will be hereafter explained, to the tubular steering axle. The members —*a.a*— are fixed to the pins 4 by the nuts 4' screwed to the threaded ends of 4. These members are connected above by the transverse stay-bolt 5 passing through the eyes 1'.1' and threaded at its ends, to carry nuts 5'. Owing to this mode of construction the members —a.a—, which are interchangeable, may be easily dismounted and replaced in case repairs are required. With a view to give to the fork a more graceful form, tapering toward the front, the axis of the pins 4, instead of intersecting that of the steering-head sleeve —c—, around which the fork rotates, is by preference brought slightly forward to the degree —x—, as is clearly seen by examining the Figs. 1, 4 and 5. This arrangement results also in increasing the angle of deviation of the fork as a whole, limited by the abutment of the members —a.a— upon the tube —d'— of the frame.

Into a hole of the bridge —b— of the fork (see Fig. 4) the tubular steering axle 6 is forced and welded; this tubular steering axle is made to rotate inside the sleeve —c— by the two sets of balls 7, 8 placed between the cups 7', 8' which are situated in convenient recesses of the sleeve —c—, and the cones 7'', 8'' the first fixed tightly against the bridge —b— and the second screwed in such a manner as to be adjustable to the tube 6.

On the stay-bolt 5 coupling the upper ends of the members—a a—of the rigid fork, are hinged by means of their eyes 9'.10' the two semicylindrical jaws 9.10 which are placed horizontally and between which the handle-bar —h—, provided at this point with the reinforcement sleeve —h'—, is placed in such manner as to be capable of rotating and therefore adjustable. The jaws 9.10 end in the rear in the cylindrical parts 9''.10'', placed vertically and destined to be inserted upon the upper end of the tube 6 until the part 10'' abuts upon the adjusting cone 8''. The contact may be effected within a conical seat 8''' of the adjusting cone 8'' in which the lower conical edge 10''' of 10'' is adjusted. The cylindrical part 9'' shows in its upper part a hemispherical recess in which the head of the bolt 12 bears being screwed to the inside of the tube 6. Owing to this arrangement, by tightening the bolt 12 the two jaws 9, 10 are pressed tightly against the handle-bar —h—, which is thus fixed in any desired position; the cylindrical sleeve 10'' is further forced against the adjusting cone 8'', which is thus fixed in place; finally the stay-bolt 5 is firmly coupled to the steering axle 6, and with it the upper ends of the members —a.a— of the rigid fork.

On the stay-bolt 5, between the eyes 10' of the jaw 10 and those 1' of the members —a.a— are placed the spacing sleeves 13, which may be provided with bosses 13' serving to attach the supporting arms —i'— of the headlight —i— (see Fig. 1). These sleeves 13 are fixed between 1' and 10' at the time of tightening the nuts 5', and the efficacy of this mode of attachment may be increased by the aid of radial teeth provided on the faces of 1' and 13 (see Fig. 5) destined to engage each other mutually.

The lower jaw 10 may have a cavity —10ª— corresponding to an opening 6' made in the steering axle and to an opening —h''— provided in the handle-bar —h— and the sleeve —h'—. This arrangement is intended to permit the passage of flexible transmissions leading from the grips of the handle-bar and serving, for instance, to control the ignition advance or the throttle valve for the explosion mixture supplied to the motor. These flexible transmissions may lead from the axle 6' from below or sidewise through a hole —b'— made in the bridge —b— (see Fig. 4).

The elastic counter-fork —e— consists of the lower part which is practically in the form of a fork the tubular prongs 14 of which end below in the eyes 14', while at the center of the arched bridge which connects the two prongs is fixed the tubular body 15 sliding smoothly inside the head portion 16 of a casing, the lower part of which 16', which does not come into contact with 15, serves to cover or overlap. Between the upper part 16, which is closed by the cap 16'', and the lower part 16' there is a conical enlargement 16''', expanded at the top, in which is located an annular friction lining 17, of fiber, leather or other suitable material, shown in detail in Fig. 8. This lining is subdivided into several parts, which under the action of springs 17' situated partly inside some convenient recess 17'' adjust themselves on the conical inner wall of 16''' and against the cylindrical wall of 15. Inside the tubular body 15 and the casing 16 is situated the elastic system of the counter-fork. This elastic system is composed of the strong compression spring 18 reacting against the cap 16'' and the inner projection 15' of 15, and of the rebound spring 19, made of round wire fixed by screwing its last windings tightly compressed together and having a smaller diameter, to the two screw-threaded pins 20, 21. The pin 20 is attached, by welding and riveting, for instance, to the arched bridge which connects the prongs 14, and the other 21, is passed through a convenient hole in the cap 16'', on which it bears by means of its collar 21', ending in the eye 21''.

Owing to the arrangement described above the mounting of the springs inside the elements 15 and 16 is easily effected in the following manner: First of all the spring 18 is placed at the bottom of 15 and the lower end of the spring 19 is screwed to the first spirals of 20; the casing 16 is put in place and the pin 21 is screwed to the upper end of the spring 19, which can be done on condition that the pins 20 and 21 be of a suitable length. By continuing to screw the pin 21 the spring 19 will be fully screwed on the said pins, while at the same time the compression of the compression spring 18 is effected to the desired degree.

The counter-fork is jointed to the rigid fork at the top by the eye 21″ of the pin 21, which eye, situated in the recess 9‴ provided between the eyes 9′ of the hinge of the upper jaw 9 (see Figs. 3 and 5), is crossed by the coupling stay bolt 5. Below the coupling is effected by the pair of triangular links —1—, one of which is shown in detail in Fig. 6, and which are jointed by their two upper eyes 22, 22′ to the eyes 2′ of 2 and 14′ of 14, while the fixed axle of the wheel —g— is secured for instance by means of the bolts 23, to the third lower eye 22″ of each link. The lever arm —l—, in its normal position of equilibrium is at about 45° in respect to the vertical and is by preference longer than the arm of lever —l′—, which is almost horizontal and following a shock the load on the wheel acts on the counter-fork which operates to absorb it elastically. The joint of each link at the lower ends of the fork and of the counter-fork is effected, as shown, in detail in Fig. 7, by means of a bolt with grease lubrication 24, screwed to the lower eye of the fork or of the counter-fork and fastened to it by the lock nut 24′. The eye of the link pivots on the stem of the bolt, while a grease box 24″ is screwed to the head of the bolt and serves to force the lubricant through the passages 24‴ as far as the joint.

The fork works as follows:

The load acting on the front wheel of the vehicle and the elastic reaction of the rebound spring 19 tend to keep the main spring 18 compressed, so that the whole assumes a normal position of equilibrium, for instance that shown in Figs. 1 and 4. The shocks against the wheel —g—, caused by the unevenness of the ground, are transmitted through the links 1, 1′ to the counter-fork which is shortened by entering with its tube 15 into the casing 16, while the spring 18, by being compressed, absorbs the dynamic action of the shock. It is to be noted here, that the entrance of 15 into 16 is not at all impeded by the annular friction lining 17, for during this movement the latter tends to be pushed toward the widest part of the conical enlargement 16‴. Once the dynamic action of the shock is over, the spring 18 tries to expand by bringing the whole back to its normal position of equilibrium. Against this sudden recoil motion which would cause the system to oscillate about its normal position of equilibrium, the rebound spring 19 opposes itself, which spring during this return movement, is again tightened. Further, the annular friction lining 17 also acts in opposition, for its various segments are forced, while the tube 15 is recoiling, toward the bottom of the recess 16⁗ and pressed against the tube itself in such a way as to brake the recoil very energetically. The return of the whole to its normal position will thus be effected smoothly and without shocks and almost without oscillations about the middle position of equilibrium. Owing to this arrangement the maximum effect of elasticity is secured in the suspension and the shocks which would otherwise be transmitted to the frame of the motorcycle are practically completely absorbed.

I claim:

1. In a motor cycle or the like, a steering tube, a steering axle mounted therein, ball bearings interposed between the axle and tube, a bridge-piece on the lower end of the axle, rigid fork members mounted on the bridge piece, between their upper and lower ends, a stay-bolt connecting the upper ends of the fork members, jaws for supporting the handle bar mounted on the stay bolt and having sleeves surrounding the steering axle, and a bolt screwed into the upper end of the latter whereby the adjustment of the bearings is effected.

2. In a motor cycle or the like, the combination with a steering axle, of a steering fork comprising two members rigidly connected between their ends to the lower end of the axle, means connecting the upper ends of said members to the upper end of the axle, an elastic counter-fork comprising inner and outer telescoping members, means connecting the outer member to the upper ends of the steering fork, means pivotally connecting the lower ends of the forks together, a compression spring and a rebound spring mounted in the telescoping members, means connecting the ends of the rebound spring with the outer ends of the telescoping members, and a retarding means interposed between the inner and outer telescoping members.

3. In a motor cycle or the like, the combination with a steering axle, of a steering fork comprising two members rigidly connected between their ends to the lower end of the axle, means connecting the upper ends of said members to the upper end of the axle, an elastic counter-fork comprising inner and outer telescoping members, means connecting the outer member to the upper ends of the steering fork, means pivotally connecting the lower ends of the forks together, a compression spring and a rebound spring mounted in the telescoping members, means connecting the ends of the rebound spring with the outer ends of the telescoping members, a conical enlargement in the outer telescoping member diverging toward the top of the latter, an annular friction lining in said enlargement, and resilient means for pressing the lining toward the bottom of the enlargement whereby the movement of the telescoping members to normal position is retarded.

4. In a motor cycle or the like, a steering axle, a steering fork rigidly connected to the axle, an elastic counter-fork comprising a telescoping casing connected at its upper end to the upper end of the rigid fork, a compression spring and a rebound spring mounted in the casing, a conical enlargement formed in the outer portion of said casing, an annular friction lining mounted in said enlargement and operating to retard the movement of the parts of the casing to normal position, and means for pivotally connecting the lower ends of the rigid and elastic forks together.

5. In a motor cycle or the like, the combination with a steering tube, a steering axle therein and ball-bearings interposed between the tube and axle, of a steering-fork comprising two interchangeable curved members rigidly connected between their ends to the lower end of the steering axle, a stay-bolt connecting the upper ends of the fork members, jaws for supporting the handle-bar mounted on the stay-bolt and having sleeves surrounding the upper end of the steering axle, a bolt screwed into said upper end bearing on the sleeves, an elastic counter fork comprising a telescoping casing connected at its upper end to the stay-bolt, a compression spring and a rebound spring mounted in the casing, threaded members mounted in opposite ends of the casing engaging the end windings of the rebound spring, a conical enlargement in the outer member of the telescoping casing and diverging toward the top of the latter, an annular friction lining in said enlargement, springs for pressing the lining toward the bottom of the enlargement, whereby the movement of the telescoping members to normal position is retarded, and links pivotally connecting the lower ends of rigid and counter forks together.

In testimony that I claim the foregoing as my invention, I have signed my name.

EDMONDO MICHELE BORGO.